US007908368B2

(12) United States Patent
Strole

(10) Patent No.: US 7,908,368 B2
(45) Date of Patent: Mar. 15, 2011

(54) METHOD AND APPARATUS FOR REDIRECTING DATA TRAFFIC BASED ON EXTERNAL SWITCH PORT STATUS

(75) Inventor: Norman C Strole, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 12/236,205

(22) Filed: Sep. 23, 2008

(65) Prior Publication Data

US 2010/0077067 A1 Mar. 25, 2010

(51) Int. Cl.
*G06F 15/173* (2006.01)
*G01R 31/08* (2006.01)
*H04L 12/28* (2006.01)

(52) U.S. Cl. ......... 709/224; 709/239; 370/236; 370/389

(58) Field of Classification Search .................. 709/224, 709/239; 370/236, 389
See application file for complete search history.

(56) References Cited

U.S. PATENT DOCUMENTS

| 6,185,185 | B1 * | 2/2001 | Bass et al. ..................... 370/230 |
| 6,496,502 | B1 | 12/2002 | Fite, Jr. et al. |
| 6,968,464 | B2 | 11/2005 | Gardiner et al. |
| 7,332,234 | B2 | 2/2008 | Levinson et al. |
| 2002/0085586 | A1 * | 7/2002 | Tzeng ........................... 370/475 |
| 2002/0103889 | A1 * | 8/2002 | Markson et al. .............. 709/223 |
| 2005/0213596 | A1 | 9/2005 | Mizutani |
| 2005/0254430 | A1 | 11/2005 | Clark et al. |
| 2006/0126654 | A1 * | 6/2006 | Nilakantan et al. ........... 370/437 |
| 2006/0165002 | A1 * | 7/2006 | Hicks et al. ................... 370/248 |
| 2006/0203715 | A1 | 9/2006 | Hunter et al. |
| 2006/0206602 | A1 | 9/2006 | Hunter et al. |
| 2006/0221961 | A1 * | 10/2006 | Basso et al. ................... 370/390 |
| 2007/0041328 | A1 | 2/2007 | Bell, IV |
| 2007/0183333 | A1 | 8/2007 | Kaur et al. |

* cited by examiner

*Primary Examiner* — Ranodhi N Serrao
(74) *Attorney, Agent, or Firm* — Cynthia G. Seal; Jeffrey L. Streets

(57) ABSTRACT

Method for redirecting outbound VLAN traffic away from an inactive external port of a switch. A first switch monitors the active or inactive status of a designated external port. A host computer periodically queries the first switch requesting the status of the designated external port. The first switch replies to the query indicating the current status of the designated external port. If the external port is inactive, the host computer redirects data traffic away from the inactive designated external port to an alternate external port without deactivating the designated internal port. Preferably, the designated internal port continues to be used for secure internal LAN communications, such as between a host computer and a management entity. When the designated external port is again active, data traffic is returned to the designated external port.

20 Claims, 3 Drawing Sheets

| Internal Port ID (Trunk VLANs) | External Port ID (Trunk VLANs) | External Port Status |
|---|---|---|
| Int1 (100,200,400) | Ext1 (100,200) | Active |
| Int2 (100,200,400) | Ext2 (100,200) | Active |
| Int3 (100,200,400) | Ext3 (100,200) | Active |
| Int4 (110,210,410) | Ext4 (110,210) | Inactive |
| Int5 (110,210,410) | Ext5 (110,210) | Active |
| Int6 (100,200,400) | Ext6 (100,200) | Inactive |
| Int7 (100,200,400) | Ext7 (100,200) | Inactive |
| Int8 (100,200,400) | Ext8 (100,200) | Active |
| Int9 (100,200,400) | Ext9 (100,200) | Active |

FIG. 2

METHOD AND APPARATUS FOR REDIRECTING DATA TRAFFIC BASED ON EXTERNAL SWITCH PORT STATUS

BACKGROUND OF THE INVENTION

1. Field of the Invention

The present invention relates to methods and systems for managing traffic to and from a host computer, such as a server blade, in response to the active or inactive status of an external switch port.

2. Background of the Related Art

A typical computer system will include a network interface card that allows the computer system to communicate with a network. In a server blade chassis, multiple server blade computers each have at least one pair of network interface cards that are connected to an internal chassis switching system. This chassis switching system communicates with the network through one or more external switching systems. However, if any of the communication links fail or become unavailable, communications from the server blade(s) using that link can become lost.

A virtual local area network (VLAN) is a group of hosts with a common set of requirements that communicate as if they were attached to the broadcast domain regardless of their physical location. A VLAN has the same attributes as a physical local area network (LAN), but it allows for end stations to be grouped together even if they are not located on the same network switch. Accordingly, network reconfiguration can be done through software instead of physically relocating devices.

A VLAN trunk is typically used to carry communications for multiple logical networks over a common physical link. An intermediate Layer 2 switch or bridge device may forward a subset or all VLANs associated with an internal VLAN trunk to an external link. Loss of the external link may thus impact a subset or all of the VLAN traffic (communications) associated with the internal trunk link. It is therefore important to quickly detect the loss of the link and take steps to re-establish communication with the network.

Accordingly, a host computer station may include a firmware agent that periodically issues a TCP/IP ping or an address resolution protocol (ARP) request to a remote target computer station. An active communication will result in a return response. The absence of a return response is an indication to the firmware agent that the path between the host and the remote station is inactive. The firmware agent of the host will then initiate recovery action(s) to redirect outbound traffic to another physical path and continue to test the inactive link to determine when the path to the remote station has been reactivated. Although this method is typically used to detect loss of a physical path, it is also applicable to loss of a logical path, such as through an intermediate router or gateway. Loss of the path is implied by absence of a response from the remote station.

Patent Publications US 2006/0206602 and US 2006/0203715 describe a method and system that redirects traffic from a server blade to different access switches that each provide data communication with a network. The server blade has a primary interface associated with a first access switch and secondary interface associated with a second access switch. Each access switch has external ports directed toward a network, and corresponding internal ports directed toward the server blades. In the event that a first access switch loses a data signal or connection at one or more of its external ports, the corresponding internal port(s) is (are) automatically disabled. The disabling of the internal port causes the primary interface in the server blade to failover to the secondary interface that is coupled to the second access switch.

BRIEF SUMMARY OF THE INVENTION

One embodiment of the present invention provides a method for redirecting outbound VLAN traffic away from an inactive external port of a switch within a blade server chassis. The method comprises a first switch monitoring the status of a designated external port, wherein the status of the designated external port is selected from the group consisting of active and inactive. A host computer within a blade server chassis periodically sends a query to the first switch to request the status of the designated external port, wherein the host computer has a first connection to a designated internal port that is mapped to the designated external port of the first switch and a second connection to an alternate internal port that is mapped to an alternate external port. In response to receiving the query, the first switch provides a reply communication to the host computer, wherein the reply communication includes the status of the designated external port. Then, in response to receiving the reply communication from the switch indicating that the status of the external port is inactive, the host computer redirects outbound VLAN traffic away from the inactive designated external port through the alternate internal port to the alternate external port without deactivating the designated internal port.

BRIEF DESCRIPTION OF THE SEVERAL VIEWS OF THE DRAWINGS

FIG. 2 is a port status table that exemplifies data that is maintained by an intermediate Layer 2 device or the chassis management subsystem.

DETAILED DESCRIPTION OF THE INVENTION

Figure 1:
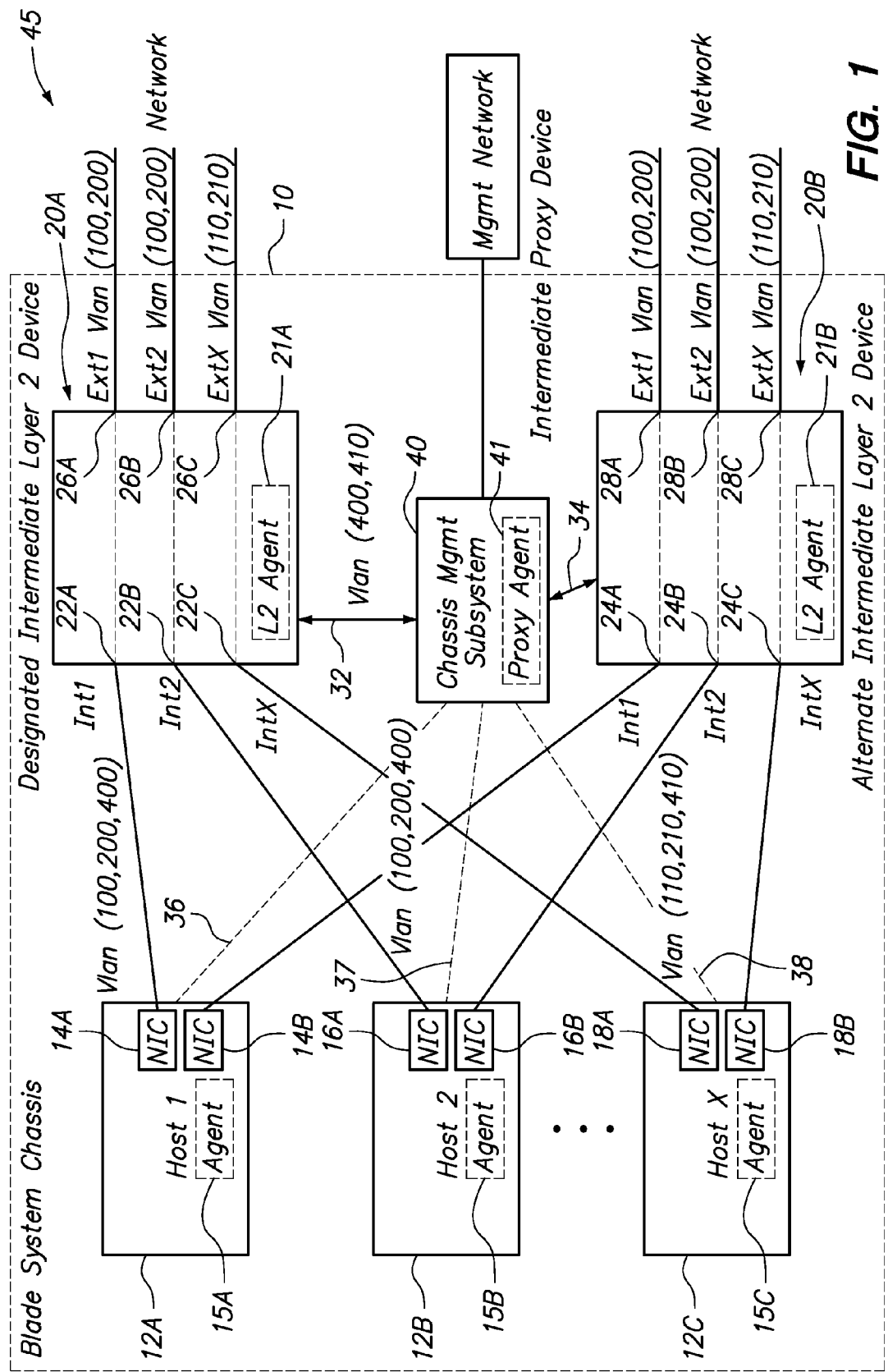
FIG. 1 is a block diagram of an exemplary server blade system chassis including multiple server blades and two intermediate Layer 2 devices.

One embodiment of the present invention provides a method for redirecting outbound VLAN traffic away from an inactive external port of a switch within a blade server chassis. The method comprises a first switch monitoring the status of a designated external port, wherein the status of the designated external port is selected from the group consisting of active and inactive. A host computer within a blade server chassis periodically sends a query to the first switch to request the status of the designated external port, wherein the host computer has a first connection to a designated internal port that is mapped to the designated external port of the first switch and a second connection to an alternate internal port that is mapped to an alternate external port. In response to receiving the query, the first switch provides a reply communication to the host computer, wherein the reply communication includes the status of the designated external port. Then, in response to receiving the reply communication from the switch indicating that the status of the external port is inactive, the host computer redirects outbound VLAN traffic away from the inactive designated external port through the alternate internal port to the alternate external port without deactivating the designated internal port.

Where the switch, or other intermediate Layer 2 device, provides a one-to-one mapping of internal ports to external ports, such as common to so-called "pass-through devices"

within a blade server chassis, the status of the designated external port is sent to the host computer via the corresponding designated internal port. The host device can use the designated external port status information to enable redirecting of selected VLAN traffic to an alternate external port, such as an alternate VLAN trunk, when the designated external port is inactive. Beneficially, the designated internal port to the switch remains operable to traffic not affected by loss of the designated external port.

The port status information is maintained by an intermediate Layer 2 device, such as a switch, or an intermediate proxy agent, which may be part of a management system. The port status information includes the instantaneous status of each of the external ports of the switch and optionally includes the identification of a corresponding internal port (although this later identification may be fixed in a pass-through device). A list of VLAN identifications associated with a particular internal or external port is also maintained, either by the switch, the intermediate proxy agent, or the host computer.

The host computer periodically queries the switch or intermediate proxy agent, whichever is maintaining the port status information, to request the status of the designated external port. The device maintaining the port status information responds appropriately based upon the instantaneous port status to indicate the status of the associated external link(s) to the host computer. The host computer responds to an inactive designated external port by redirecting traffic that is associated with that port. All traffic or VLANs from the host computer that does not rely upon the inactive external port can continue to utilize the designated internal port, which remains active.

The host computer continues to monitor the status of the external link, via the same procedure of queries and responses, to determine when the designated external port has been reactivated. Responses provided by the device maintaining the port status information may be either explicit or implicit. For example, an implicit response may include a switch not providing a response to an ARP request or PING. An explicit response may be in the form of a message or indication that a specific port has in fact become inactive or reactivated.

The foregoing methods offer several advantages over existing methods of redirecting traffic away from an inactive external port of a switch. The network message exchange between the host and intermediate device is constrained and does not involve an additional remote device or network links. This method is particularly applicable to blade server chassis systems, but is applicable to conventional rack systems. Furthermore, the present methods can utilize existing host computer methods with the switch implementation customized to map specific internal and external ports.

In an additional embodiment, the switch maintains an ordered list of all designated external ports and the internal port corresponding to each external port. The status of each external port of the switch is maintained in a record as an indicator of the link's status (e.g., active, inactive, etc.). In one embodiment, a firmware agent within the host station periodically issues a query packet (such as a TCP/IP ARP Request or PING) to a unique IP address within the switch. The source MAC address or other unique content of the query packet can be used by the switch to determine the physical identification of the internal port, thus forming an index into the port status table. Other means specific to the switch may be used to form the index as well.

In this embodiment, an agent within the switch will issue a positive response to the PING if the corresponding external port is active (i.e., the external port mapped to the internal port from which the query originated). Otherwise, the switch will issue a negative response (or no response at all) if the corresponding external port is inactive. The host computer, optionally through use of a firmware agent, will take the appropriate action if a negative response is received. For example, the host firmware agent may take action to redirect all VLAN traffic associated with an inactive external port to another path (e.g., separate physical port or network interface card (NIC)). The host computer will continue to maintain an active link with the internal port of the switch and will periodically query to determine when the external port has been reactivated. Likewise, any VLAN traffic that may have been associated with other external or internal ports of the switch will continue to flow from the host over the internal link. This is unlike the methods disclosed in US 2006/0206602 entitled Network Switch Link Failover in a Redundant Switch Configuration or in US 2006/0203715 entitled Method for Redirection of Virtual LAN Network Traffic. In both of these publications, the designated internal port is deactivated by the switch and all VLANs associated with the designated internal port must be redirected to an alternate internal link.

In another embodiment, a management entity (e.g., intermediate proxy device) separate from the Layer 2 device maintains the port status information that is acquired from the Layer 2 device and responds on behalf of the Layer 2 device to query packets issued by attached host agents. Such operation to separate the management entity from the Layer 2 physical device may be transparent to the host computer or host agent. In the context of a server blade chassis, the intermediate proxy device may be the chassis management module.

FIG. 1 is a block diagram of an exemplary server blade system chassis 10 including multiple server blades 12A-C, two intermediate Layer 2 devices 20A-B, and an intermediate proxy device, such as chassis management subsystem 40. Each of the server blades or host devices 12A-C (only three shown) have a pair of network interface cards (NIC) that enable inbound and outbound communications, for example using an Ethernet protocol. For example, the server blade 12A has a first NIC 14A that is coupled to a first internal port 22A of the "designated" intermediate Layer 2 device 20A and a second NIC 14B that is coupled to a first internal port 24A of the "alternate" intermediate Layer 2 device 20B. The term "designated" is used here to indicate the device that blade server 12A is instructed to use as its primary path for communication with an external network 45. The server blade 12A will utilize the designated device 20A unless the path becomes inactive. Similarly, the server blades 12B, 12C each have a first NIC 16A, 18A, respectively, that is coupled to an internal port 22B, 22C, respectively, of the "designated" intermediate Layer 2 device 20A and a second NIC 16B, 18B, respectively, that is coupled to an internal port 24B, 24C, respectively, of the "alternate" intermediate Layer 2 device 20B. Accordingly, each blade server or host computer can communication with either or both of the intermediate Layer 2 devices 20A, 20B. It is possible for a host computer to use both NICs at the same time. The host computer is preferably responsible for 'balancing' the amount of traffic passing through these two ports.

The intermediate Layer 2 devices 20A, 20B are shown as "pass-through" devices in which each of the internal ports is mapped to exactly one external port. For example, the designated intermediate Layer 2 device 20A shows its internal ports 22A-C mapped to corresponding or associated external ports 26A-C. Accordingly, a collection of information identifying the internal ports and which external port is mapped to each internal port may be referred to as a "port association record." A port association record for the system in FIG. 1 would also indicate that the internal ports 24A-C of the alternate intermediate Layer 2 device 20B are associated with the external ports 28A-C, respectively. The associations within the devices 20A, 20B are generally not user-configurable, but are set by the manufacturer.

Each internal link is coupled to a host computer and the associated external link is coupled to a network. The host computer sends outbound traffic from its network interface card to the internal link of the switch, and then the switch forwards the outbound traffic through the external link to the network. Conversely, inbound traffic from the network, presumably originating from a remote computer, is received at the external link, and then the switch forwards the inbound traffic through the internal link to the host computer.

However, a preferred server blade chassis also includes a chassis management subsystem or module 40 that is coupled to both the designated and alternate intermediate Layer 2 devices 20A, 20B over separate lines 32, 34, respectively, in order to communicate with the host computers over one or more internal secure VLANs. These communications (internal VLAN traffic) do not rely upon the external links 26A-C, 28A-C and are not affected by loss of the external link(s). An important aspect of the present invention is that this internal traffic can be maintained over the designated internal ports 22A-C even when the associated external ports 26A-C become inactive, because the internal ports remain active. However, in certain embodiments (as shown) internal management communications between the chassis management subsystem 40 and one or more of the host computers 12A-C may be provided over a direct internal communication path 36, 37 or 38, respectively.

A further discussion about the operation of the invention is facilitated through a specific example. According to details provided in FIG. 1, selected VLANs (e.g., 400, 410) provide access between the server blades 12A-C and the chassis management subsystem 40 via the designated intermediate Layer 2 device 20A. Conversely, certain VLANs (e.g., 100, 200) are associated with specific external ports 26A, 26B with one-to-one mapping from specific internal ports 22A, 22B and certain other VLANs (e.g., 110, 210) are associated with another external port 26C with one-to-one mapping from a specific internal port 22C. Loss of a specific external link does not interrupt the internal path between a given host computer and the chassis management subsystem. Internal and external ports are assumed to follow an Ethernet protocol for this illustration. An alternate communications path between the host subsystems and the chassis management subsystem is optional.

Although the operation of each host computer 12A-C will generally be the same, the operation of the host computer 12A will be described in detail. The host computer 12A actively polls or queries the designated intermediate Layer 2 device 20A to determine whether the external link is active. In this case, the device 20A maintains a port status record indicating the current status of each external port of the device 20A. Specifically, a local agent 15A of the host computer 12A is preferably used to send the query to an L2 agent 21A of the designated intermediate Layer 2 device 20A. Alternatively, the port status record may be maintained by the intermediate proxy device 40, in which case the host computer 12A sends queries to the device 40. For example, the local agent 15A of the host computer 12A may send the query to a proxy agent 41 of the intermediate proxy device 40 over one or the available internal communication paths (using path 32 through the switch or using the direct path 36). With respect to the functions of the present invention, the proxy agent 41 would operate in the same manner as the L2 agent 21A, except for the apparent differences in the path of traffic with the host computers.

The Layer 2 switch 20A reads a packet header in each communication sent by the host computer and distinguishes between traffic types (via a 4-byte field in packet header that includes the VLAN value). This information allows the switch 20A to pass data traffic from a host computer 12A through an external port 26A to the network 45 (and/or in the reverse direction), while acting as a switch to send management traffic from the host computer 12A to the chassis management subsystem 40 via a secure internal VLAN (and/or in the reverse direction).

When the local agent 15A sends a query to the agent maintaining the port status record (either L2 agent 21A or proxy agent 41), the particular agent response to the local agent with the status of the external port that is associated with the local agent 15A. Optionally, the particular agent may use the source MAC address or other unique content of the query packet to determine the physical identification of the internal port, thus forming an index into the port status table and indicating which external port status is being requested.

If the response indicates to the local agent 15A that the associated external port 26A is inactive, then the local agent 15A redirects data traffic away from external port 26A of the designated switch device 20A to the external port 28A of the alternate switch device 20B. As mentioned previously, secure internal VLAN traffic between the host computer 12A and the chassis management subsystem 40 can continue without being redirected, due to the fact that the internal port 22A remains active.

Once the local agent 15A has redirected data traffic away from the external port 26A, the agent 15A will periodically query the agent maintaining the port status record. If the local agent 15A receives a response indicating that the designated external port 26A has again become active (i.e., reactivated), then the local agent 15A will return to directing data traffic of VLAN (100, 200) through the external port 26A of the designated switch device 20A rather than the alternate switch device 20B. However, it should again be recognized that the local agent 15A may balance traffic between the two switch devices 20A, 20B when the both external ports 26A, 28A are active.

Another embodiment of the invention is implemented using a full L2 switch rather than a pass-through switch. Although the method is particularly suited to a pass-through L2 switch that will only send host traffic to one external port and to the internal management module, the method may also be implemented with a general L2 switch that can pass traffic among blade servers 12A-C. In this embodiment, a network administrator establishes group associations that represent the collection of internal and external ports that have a common VLAN. More specifically, a full L2 switch can be partitioned into multiple groups, with each internal host group having network access via a unique set of external ports. However, rather than deactivating all of the internal ports grouped with an external port that is lost in order to cause failover to the alternate switch, this embodiment allows the designated internal ports to remain active for management traffic and causes the host stations to redirect the data traffic to the alternate internal ports.

In an additional embodiment, the invention may be carried out using an L2 switch that implements trunk failover, with the internal ports being deactivated by the switch when associated external ports are inactive. This creates the same problem with regard to loss of secure management VLANs between the blade and the chassis management module. Because the L2 switch firmware, such as the L2 agent, already maintains a port association record (i.e., an association between one or more internal ports and one or more external ports), this embodiment causes the switch to deactivate only those internal ports that are associated with a unique subset of the external ports (LACP group, Etherchannel, etc.). Accordingly, a PING or ARP query from a server blade is associated with the status of the associated group of external ports, rather than a single external port. The L2 switch will issue an explicit response to the PING/ARP query as a positive indication that at least one or all of the external ports in the group are active. Likewise, loss of all external ports in the group associated with the internal port will result in the L2 switch issuing a negative response, such as no response, to the PING/ARP request from the server blade. However, rather than deactivating all of the internal ports grouped with an external port that is lost in order to cause failover to the alternate switch, this embodiment allows the designated internal ports to remain active for management traffic and causes the host stations to redirect the data traffic to the alternate internal ports.

FIG. 2 is a port status table that exemplifies the port status record that is maintained by either the intermediate Layer 2 device 20A or the intermediate proxy device 40. The port status record 50 provides the port status (column 52) for each of the external ports (column 54) of the device 20A. Most preferably, the port status record 50 includes the internal port identification (column 56) that is associated or mapped to each of the external ports. According, each row of the table of FIG. 2 lists an internal port identification, the identification of the external port associated with the internal port, and the status of the external port. When the agent maintaining the port status record receives a query packet, the agent reads the internal port address within the query and returns a response that includes the external port status associated with that internal port (i.e., the status in the same row of the table containing the internal port identification).

Although the port status table of FIG. 2 includes a listing of the VLAN identifications that are associated with the internal and external ports, this information may be maintained by the local agent within the host computer instead of, or in addition to, the agent maintaining the port status record. In fact, a listing of VLAN identifications that are associated with the internal and external ports is preferably maintained by the host computer. The host computer needs to be aware of which VLANs are using the external link and which are using the internal secure path to the management module, so that the host computer can determine which of the VLANs need to be rerouted to the alternate path when an external port becomes inactive.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
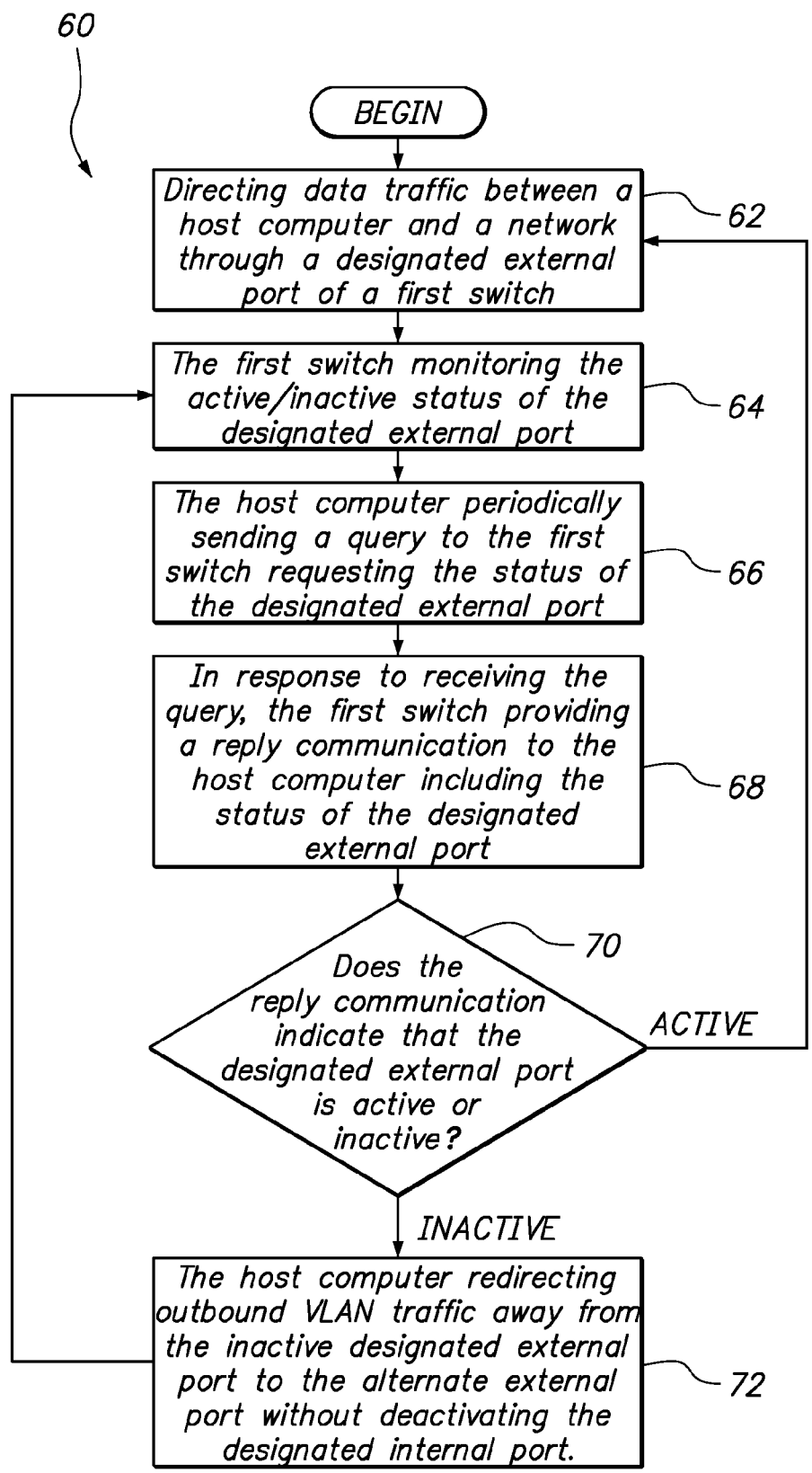
FIG. 3 is a flowchart of a method of managing data traffic between a host computer and a network.

Referring now to FIG. 3, a flowchart of a method 60 of the present invention is provided. Although the method has been described above as being implemented in a blade system chassis, the method may also be implemented in a rack system where the host computer, switch device(s), and/or management systems are interconnected via cables or wireless links. In step 62, a first switch directs data traffic between a host computer and a network through a designated external port of a first switch. In step 64, the first switch monitors the active/inactive status of the designated external port carrying the data traffic from the first switch. In step 66, the host computer periodically sends a query to the first switch requesting the status of the designated external port. In response to receiving the query, the first switch provides a reply communication to the host computer including the status of the designated external port according to step 68. Step 72 determines whether the reply communication indicates that the designated external port is active or inactive. If the designated external port is indicated as being "active," then the method returns to step 62 so that the data traffic between the host computer and the network is directed through the designated external port. However, if the designated external port is indicated as being "inactive," then, in step 72, the host computer redirects data traffic away from the inactive designated external port to an alternate external port without deactivating the designated internal port. Preferably, the designated internal port continues to be used for secure internal LAN communications, such as between a host computer and a management entity. After step 72, the method returns to step 64, such that the switch monitors the status of the designated external port. The periodic queries of step 66 and the responses of step 68 also continue. Accordingly, the data traffic is directed to the designated external port whenever it is active, but is redirected to the alternate external port whenever the designated external port is inactive. Note that the host computer does not rely upon responses from an external remote computer or other member of the external network to determine the status of the external communication link. Furthermore, communications between the host computer and the management entity may continue uninterrupted by an inactive external port.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
a first switch monitoring the status of a designated external port, wherein the status of the designated external port is selected from the group consisting of active and inactive;
a host computer periodically sending a query to the first switch to request the status of the designated external port, wherein the host computer has a first connection to a designated internal port that is mapped to the designated external port of the first switch and a second connection to an alternate internal port that is mapped to an alternate external port;
in response to receiving the query, the first switch providing a reply communication to the host computer, wherein the reply communication includes the status of the designated external port; and
in response to receiving the reply communication from the first switch indicating that the status of the external port is inactive, the host computer redirecting outbound Virtual Local Area Network (VLAN) traffic away from the inactive designated external port through the alternate internal port to the alternate external port without deactivating the designated internal port.

2. The method of claim 1, further comprising:
the host computer continuing to use the designated internal port while the designated external port is inactive.

3. The method of claim 2, wherein the host computer continues to the use designated internal port to carry VLAN traffic directed to external ports that remain active, VLAN traffic with a chassis management entity, or a combination thereof.

4. The method of claim 2, further comprising:
maintaining a port status record of the current status of each external port of the first switch.

5. The method of claim 3, further comprising:
maintaining a port association record that associates each external port of the first switch with an internal port of the first switch.

6. The method of claim 5, further comprising:
the first switch using a host computer identification contained in the query to identify the internal port to associate with the external port in the port association record.

7. The method of claim 6, wherein the port status record is maintained by the management entity, the method further comprising:
the first switch forwarding the query to the management entity;
the management entity acquiring the external port status information from the first switch; and
the management entity providing the designated external port status to the host computer.

8. The method of claim 7, wherein the query and response are sent between the host computer to the management entity via a direct communication path.

9. The method of claim 6, wherein the port status record is maintained by the first switch, the method further comprising:
the first switch providing the external port status to the host computer.

10. The method of claim 9, further comprising:
after receiving a reply communication from the first switch that the external port is inactive, the host computer periodically sending a query to the first switch requesting the status of the external port; and
in response to receiving a reply communication from the first switch that the designated external port is active, the host computer redirecting VLAN traffic away from the alternate external port through the designated internal port to the designated external port.

11. The method of claim 1, wherein the host computer is one of a plurality of blade servers in a blade system chassis.

12. The method of claim 1, wherein each of the internal and external ports are Ethernet ports.

13. The method of claim 1, wherein the first switch provides the status of the designated external port to the host computer by issuing a positive response when the designated external port is active.

14. The method of claim 13, wherein the first switch provides the status of the designated external port to the host computer by issuing a negative response when the external port is inactive.

15. The method of claim 14, wherein the negative response is no response.

16. The method of claim 1, further comprising:
the host computer maintaining a record of VLAN identifications associated with the designated external port.

17. The method of claim 1, wherein each of the internal and external ports are designated host interface and network interface ports, respectively, within a standalone network switch.

18. The method of claim 1, wherein the alternate internal port and the alternate external port are included in the first switch.

19. The method of claim 1, wherein the alternate internal port and the alternate external port are included in a second switch that is independent of the first switch.

20. The method of claim 19, wherein the host computer, the first switch, and the second switch are separate physical units within a distributed system.

* * * * *